United States Patent [19]
Blackmon

[11] Patent Number: 5,128,807
[45] Date of Patent: Jul. 7, 1992

[54] HEADGEAR WITH VIEWING MONOCULAR

[76] Inventor: Bruce B. Blackmon, P.O. Box 8, Buies Creek, N.C. 27506

[21] Appl. No.: 641,517

[22] Filed: Jan. 15, 1991

[51] Int. Cl.⁵ .............................................. G02B 7/02
[52] U.S. Cl. .................................................. 359/816
[58] Field of Search ...................... 350/248, 249, 319; 359/815, 816, 894

[56] References Cited

U.S. PATENT DOCUMENTS

| | | | |
|---|---|---|---|
| 369,114 | 8/1887 | Knapp | 350/248 |
| 1,605,725 | 11/1926 | Herbert, Jr. | 350/248 |
| 1,688,113 | 10/1928 | Bornkessel | 350/248 |
| 2,531,585 | 11/1950 | Pope | 350/249 |
| 2,625,855 | 1/1953 | Gaylor | 350/547 |
| 3,425,769 | 2/1969 | Stone | 350/72 |
| 4,577,347 | 3/1986 | Connon | 2/6 |
| 4,670,912 | 6/1987 | Hart | 2/209.1 |
| 4,839,926 | 6/1989 | Choi | 2/199 |

Primary Examiner—Frank Gonzalez
Attorney, Agent, or Firm—Dalton L. Truluck

[57] ABSTRACT

This invention involves a device for lengthy, long-range viewing of objects (e.g. wildlife, sporting events, military activities) while permitting the viewer to view same in relative comfort because the viewing device is mounted on a headgear device. Thus, the viewing means is held still while fatigue is minimized greatly. Also, the device permits use of the hands and arms for other purposes so that frequent movement thereof is avoided. The device includes a hard hat helmet with a viewing monocular pivotally attached thereto by a resilient interconnection which is rigid enough to hold the monocular in a fixed position until manually moved and flexible enough to be readily moved into line of sight with the appropriate eye.

10 Claims, 2 Drawing Sheets

HEADGEAR WITH VIEWING MONOCULAR

BACKGROUND OF THE INVENTION

This invention is in the field of viewing objects (i.e. birds, wildlife, targets, etc.) with precision from afar. Generally, such viewing has been accomplished by the use of such visual implements as binoculars, telescopes, monoculars and other visual aids. These implements, while extremely useful, do have certain disadvantages such as, (1) difficulty of holding the implement still, (2) fatigue caused by holding the implement, (3) use of one or both hands cutting down on their use for other purposes, and (4) frequent movement of hands causing detection of user by prey or adversaries.

PRIOR ART

The prior art discloses several devices having analogous subject matter to that of the herein described invention. Attention is invited to U.S. Pat. Nos. 2,625,855 (Gaylor), 3,425,769 (Stone), 4,577,347 (Connon) and 4,839,926 (Choi) as exemplary thereof. The most pertinent of those listed, supra, would appear to be Connon whose telescope is mounted on the side of the helmet in the manner of a microphone. It is to be noted that Connon's device would be bulky and apt to be entangled when working in close quarters. Connon's device also is not sturdily constructed and cannot be center mounted so as to be used with either eye. Finally, Connon makes no mention of detachability so as to permit the monocular to be carried in a pocket or other safe place when not in use.

SUMMARY OF THE INVENTION

This invention relates to a device which overcomes the above-stated disadvantages. The device comprises essentially a headgear of conventional hard hat design or a visor-type headgear having attached thereto, either permanently or temporarily, a monocular viewing tube of good optical viewing quality. The monocular tube is pivotally attached to the headgear by resilient support means so that it can be swung into and out of position by the user as desired. The monocular is attached so as to be positionally aligned with the viewer's "dominant" eye for obvious reasons. The user/viewer can then swing the monocular into alignment with the appropriate dominant eye and proceed to view the desired target in detail without the attendant disadvantages listed previously. The device can also be useful in many circumstances such as the following examples.

A. Sports 1. Hunting

The sportsman can adjust the monocular in front of his eye once. Then for hours he can look through the monocular with one eye and at the same time see the whole terrain with the other eye. At the same time, he has both hands free and rested for the use of the gun, camera, or a cup of coffee.

By a very minor tilt of the head, the hunter can look over the monocular or have clear field vision with both eyes, never causing enough movement to "spook" a deer or squirrel.

If he so desires, the monocular can be swung clear of the visual field when not in use. 2. Bird Watching Again, the monocular will be most advantageous because it requires almost no movement and no fatigue with long periods of use. 3. Football, soccer, polo, stock car racing or any sport where distant vision is useful.

The spectator can observe the whole field of play with the unassisted eye and, at the same time, can have a close up view of one player with only the slightest movement of his head. (In field testing, the instrument has been used for an hour at the time without fatigue.) 4. Sailors would find this most helpful in looking for distant landmarks without fatigue.

B. National Defense

Every soldier could be issued one of these devices which could be adapted to fit an Army helmet. It would add only a few ounces to his pack but would add significantly to his visual effectiveness and yet would be inexpensive.

C. Industry

This device would have multiple uses in industry. Many people in industry are already required to wear hard hats. This device would easily attach to their own hard hats by clips or small bolts so that the employee could read meters, gauges, figures, etc. at distances without coming close to dangerous machines or dangerous or tiresome terrain.

DETAILED DESCRIPTION OF INVENTION

This invention relates to a device for viewing targets or objects at long range for long periods of time without fatigue or distraction caused by overuse of the arms and hands.

Figure 1:
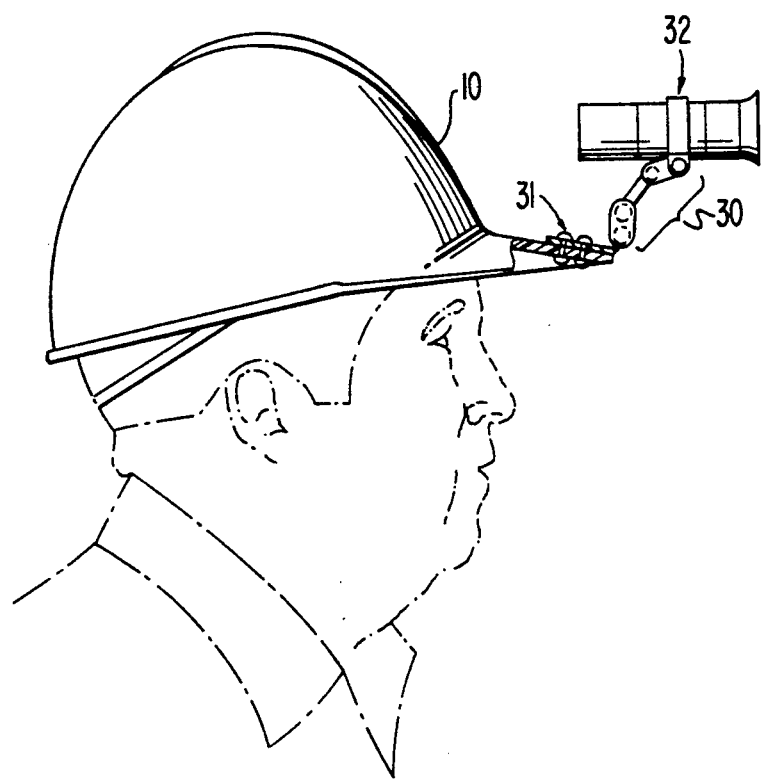
FIG. 1 is a side view, partly in section of the combination headgear and monocular viewing tube pivoted out of eye alignment.
Figure 2:
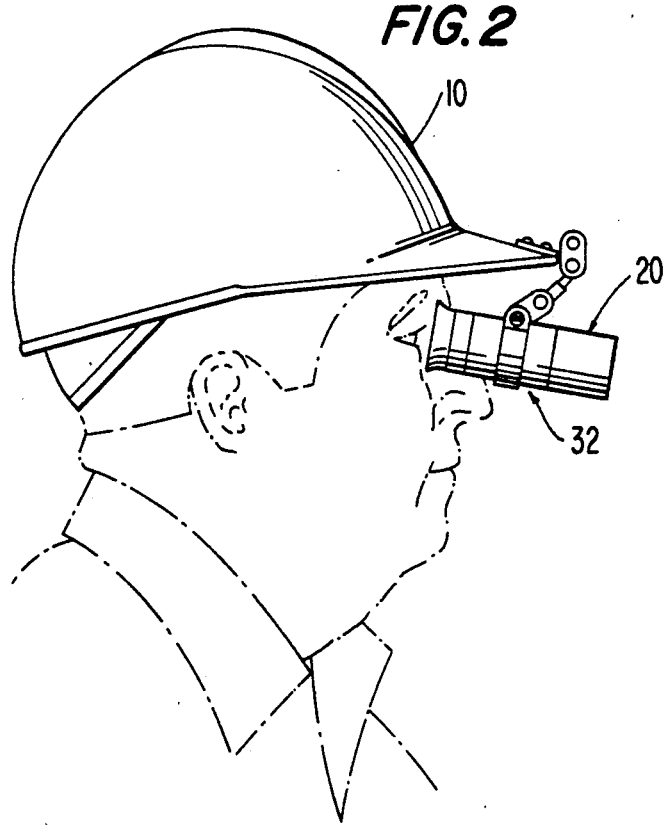
FIG. 2 is a side view of the device with the monocular tube into alignment with the eye during use.

Specifically, this device includes a headgear 10 of conventional hard hat design adapted for stable placement on a viewer's (person's) head or a sunvisor or cap design could be substituted therefor. The particular shape or design of the headger is not important in the context of this invention, only that it be of semi-rigid construction to enable it to provide a suitable base support for a monocular viewing tube means 20 which is to be secured to the front rim of the headgear 10 usually above the person's dominant eye. Attention is invited to FIGS. 1 and 2 which clearly shows the monocular 20 resiliently mounted to the headgear 10 by means of a series of jointed rods, as at 30, which permit the monocular to be vertically, pivotally swung into and out of viewing position as shown. The resilient mounting connection means 30 can be permanently secured to the headgear 10 at one end by means of rivets, screws or bolts (as at 31, FIG. 1). The other end of the resilient mounting connection means 30 can be secured to the monocular tube 20 by means of a clamp ring 32 or other equivalent sleeve means. Also, an integral tab with a bolt hole thereon could be provided on the monocular which could then be secured to the resilient mounting means 30 by a bolt or other type threaded connection. It will be understood that the resilient mounting connection means 30 can take the form of other designs such as, for example, a "goose neck" cable tube device or a flexible plastic hinge device with "memory". The important feature of the resilient mounting connection mean is that it be rigid enough to hold the monocular 20 in a fixed position until manually moved and flexible enough to be readily adjusted into line of sight of the eye.

The monocular viewing means 20 can be selected from any high quality grade brands presently on the market. One such example is manufactured by Simmons, Model No. 1160 (8×25- Field 8.7°).

Figure 5:
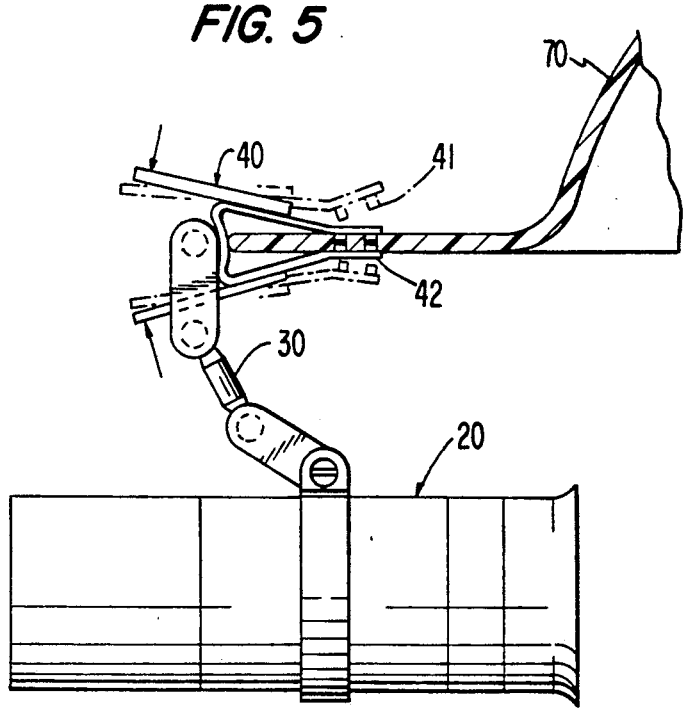
FIG. 5 is a modified version of the device wherein the monocular is removably attached to the headgear.

Attention is invited to FIG. 5 wherein a modification of the resilient mounting connection means is shown. Note detachable spring clamp means 40 secured to the mounting means 30. This arrangement permits the monocular means 20 to be easily disengaged from the headgear 10 as desired by the use by squeezing the spring clamp in the direction of the arrows. The spring clamp 40 has projections 41 on the end thereof that mate with recesses or apertures 42 within the front rim of the headgear 10. Obviously, other equivalent type detachable clamp means can be used in place of the particular spring-clamp means shown. This modification provides the user with flexibility to remove the device when not in use so as to prevent damage to the monocular means during periods of travel or other non-viewing activities.

Figure 3:
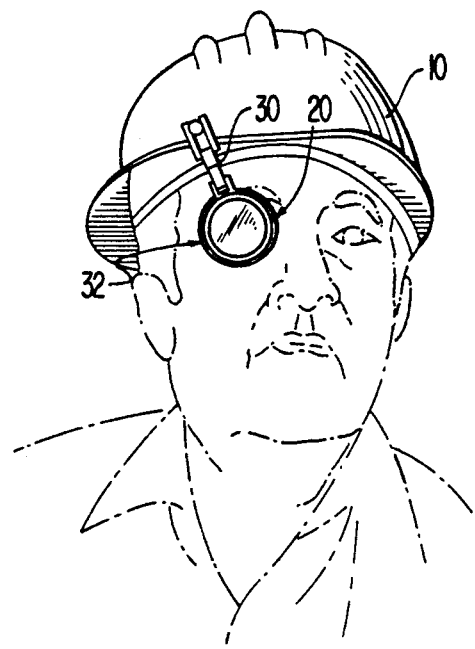
FIG. 3 is a front view of the device with the user looking directly through the tube as in FIG. 2.
Figure 4:
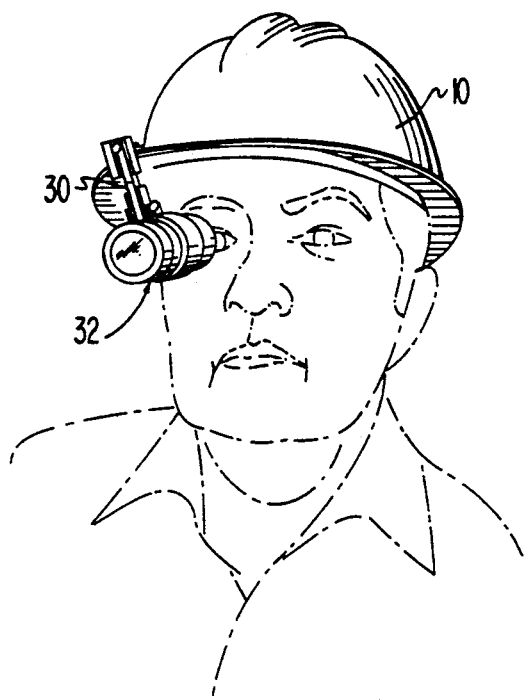
FIG. 4 is also a front view of the device showing the user tilting his head a few degrees to permit clear vision of the field with both eyes.

In use, the headgear device is mounted on the wearer's head and the monocular means 20 is brought into alignment with the person's dominant eye (FIG. 3). Protracted viewing of the target object at the wearer's discretion can then be accomplished without undue fatigue or undue distraction of arm and hand movements. The detailed viewing of the target is done through the monocular while the overall field viewing is achieved by the other eye. Tilting of the wearer's head a few degrees permits the wearer to view the entire field (see FIG. 4) with both eyes without disturbing the monocular alignment or disturbing the object being viewed. This is particularly true of wildlife being studied or hunted or perhaps during military activities. It is also within the scope of this invention to attach the monocular mounting connection to the front rim of the hard hat between the eye so that use thereof with either eye is feasible.

Thus it is seen that the invention is of simple construction, inexpensive to manufacture, and provides many advantages over the prior art as stated previously.

Those skilled in the art will recognize or may ascertain using routine experimentation, numerous equivalents to the specific embodiments described herein. Such equivalents are within the scope of the claims.

I claim:

1. A combination headgear and viewing means device comprising a headgear of semi-rigid construction having a front support rim, a monocular viewing means and a resilient interconnecting mounting means for attaching the monocular viewing means to said headgear, said resilient interconnecting mounting means being rigid enough to hold the monocular viewing means in a fixed position until manually moved but flexible enough to be readily adjusted into line of sight alignment with the eye, said resilient interconnected mounting means being secured at one end to said front support rim of the headgear above the eyes and at the other end to said monocular viewing means whereby the person using said device can position the monocular viewing means in front of the appropriate eye for protracted viewing of the desired target object while the headgear remains stabilized enabling the person to view target objects in detail at length through the monocular viewing means while also permitting overall viewing of the field around the monocular viewing means with the same eye by slight tilting of the head.

2. A device as in claim 1 wherein said resilient interconnecting mounting means comprises a series of jointed rods pivotally connected together.

3. A device as in claim 1 wherein said resilient interconnecting mounting means is fixedly attached to said headgear front rim by means of rivets or bolts.

4. A device as in claim 1 wherein said resilient interconnecting mounting means is detachably secured to said headgear front rim by means of a removable clamp.

5. A device as in claim 4 wherein said clamp is spring biased and said clamp is provided with projections adapted to mate with corresponding apertures in said headgear front rim.

6. A device as in claim 1 wherein said resilient interconnecting mounting means is secured to said monocular viewing means by a tab connection attachment.

7. A device as in claim 6 wherein said tab connection attachment is attached to said monocular means by a ring clamp means.

8. A combined monocular viewing means and resilient interconnecting mounting means for attaching said monocular viewing means to a headgear comprising a monocular tube viewing means having secured therearound a ring clamp, said ring clamp having secured thereto a resilient, pivotally mounted interconnecting means having a separate end away from said monocular tube viewing means to which is secured a spring biased clamp, said spring clamp adapted to be secured to said headgear to removably retain said monocular tube on said headgear.

9. A device as in claim 8 wherein said spring clamp is provided with projections adapted to mate with corresponding apertures in said headgear.

10. A device as in claim 8 wherein said resilient interconnecting mounting means comprises a series of pivotally joined rods.

* * * * *